United States Patent [19]

Haas

[11] Patent Number: 5,110,201

[45] Date of Patent: May 5, 1992

[54] FILM TRANSPORT DEVICE

[75] Inventor: Josef Haas, Vienna, Austria

[73] Assignee: Arnold & Richter Cine Technik GmbH & Co. Betriebs KG, Munich, Fed. Rep. of Germany

[21] Appl. No.: 615,073

[22] Filed: Nov. 19, 1990

[30] Foreign Application Priority Data

Nov. 23, 1989 [DE] Fed. Rep. of Germany ....... 3938983

[51] Int. Cl.$^5$ .............................................. G03B 21/48
[52] U.S. Cl. ..................................... 352/180; 352/187; 352/182
[58] Field of Search ................ 352/180, 182, 187, 190

[56] References Cited

U.S. PATENT DOCUMENTS 4,022,525 5/1977 Boudouris ........................... 352/187
4,253,749 3/1981 Boudouris ........................... 352/187
4,697,896 10/1987 Fox ...................................... 352/180

Primary Examiner—Monroe H. Hayes
Attorney, Agent, or Firm—Fish & Richardson

[57] ABSTRACT

Film transport device with a film transport sprocket driven by a drive motor whose teeth engage the holes in a motion picture film with play and transport the latter stepwise one frame at a time and final-position it at a film gate. The film transport steps are subdivided into a transport phase ($t_T$) and a position-adjusting phase ($t_R$) in which the film is final-positioned accurately. The transport phase ($t_T$) is divided into a very short acceleration phase ($t_1$, $t_2$) in which a high torque setting ($M_{S1}$) is set with a steep acceleration rise ($t_1$), and a long continuous drive and braking phase ($t_3$, $t_4$), whose time constant is a multiple of the acceleration phase ($t_1$, $t_2$). This ensures minimum transport noise and film-protective transport.

13 Claims, 4 Drawing Sheets

FILM TRANSPORT DEVICE

The invention relates to a film transport device.

German Patent 27 60 024 teaches a film transport device for transporting film in a film projector with a rotating shutter and a drive motor, on whose shaft a perforated disk with a lower-order control circuit is provided to generate control signals as a function of the angular position of the motor shaft.

The control signals of the control circuit switch the drive motor through a power amplifier and are subdivided into three movement phases, whereby within a first shaft rotation angle a constant acceleration is conferred on the drive motor, in a second shaft rotation angle the drive motor is kept at constant speed, and in a third shaft rotation angle, it is braked with a constant delay.

In this known film transport device for intermittent transport of the individual frames, an energy-optimized transport pattern with a constant acceleration and a constant deceleration is desired, whereby the film is transported between two intervals through a preset rotary angle at a constant speed. As a result, constant film tension is achieved and peak loads on the film tension are avoided.

Because of the sudden transitions from the acceleration phase to the uniform running phase with constant velocity and from the constant running phase to the deceleration phase, however, increased stresses on the film as well as louder noises caused by the teeth of the film transport sprocket striking the edges of the holes in the film during the changes from one phase to another are unavoidable. In addition, the impacts of the teeth against the leading and trailing edges of the holes result in damage to or at least deformation of the edges of the holes.

German Patent 27 22 378 teaches a film transport device with a film transport sprocket driven intermittently by a drive motor, the teeth of said sprocket engaging the holes in the film with play and transporting said film stepwise. A control device controls the drive motor of the film transport sprocket in such manner that it shifts the film one frame at a time. The transport process in this known film transport device is subdivided by a current pattern supplied to the drive motor of the film transport sprocket during each frame step into an acceleration phase, a braking phase, and a final positioning phase. This time-optimized transport pattern therefore contains only one acceleration phase and one deceleration phase, so that the frames can be final-positioned in a shorter time.

For final positioning, a mark detector is provided that scans marks on the film that have a fixed spatial relationship to the individual frames and generates control signals for the drive motor from this information, so that the film, depending on the degree of deviation of the film-integral marking from a predetermined set position, is transported further forward or backward. Then the deviation from the set position is detected once more and final positioning of the film is repeated if necessary until the set position is reached. Holes in the film or marks exposed onto the film serve as film-integral marks.

With this current pattern as well, there is an abrupt transition from the acceleration phase to the deceleration phase, with the result that the teeth of the film transport sprocket, during the phase transition, because of the required play between the teeth of the film transport sprocket and the edges of the holes, strike the latter, causing considerable noise and inevitably resulting in damage to the film holes.

Since in this known film transport device, for final positioning of the frames, depending on the degree of deviation of the film-integral markings from a predetermined set position, the film is transported forward and backward, there is a multiple impact of the teeth of the film transport sprocket against the edges of the holes during the final positioning process, resulting in an additional increase in noise and damage to the edges of the holes.

If the edges of the holes also serve as film-integral markings, the damage to the edges of the holes also results in only very inexact final positioning of the film and a constant deviation of the film frame from the exact position in front of the film gate.

The goal of the invention is to provide a film transport device according to the species whose film transport sprocket is so driven that a minimum amount of noise is generated and at the same time a film-protective mode of transport is ensured.

The transport pattern according to the invention for driving the film transport sprocket is optimized in view of noise generation and development and ensures a minimum noise level during film transport. At the same time a protective film transport is ensured in which any impact of the teeth of the film transport sprocket against the edges of the film holes in the motion picture film, which causes noise and damage, is avoided.

The invention is based on the fact that during the transition from the drive phase to the braking phase, the maximum noise level develops. By a gentle, in other words continuous, slow transition from the drive phase to the braking phase, this critical noise-generating range can be made much quieter.

Noise generation during the acceleration phase is less critical, so that a considerable increase in the acceleration set value, in other words a greater steepness of the acceleration slope and a greater total torque in the drive phase, does not result in any significant increase in the noise level.

In order to keep the duration of 10 ms for performing one complete film transport step, therefore, the transport pattern is displaced in such manner that a very slow transition from the drive phase to the braking phase takes place, which avoids any impact of the teeth against the edges of the holes in the film and thus avoids any chattering sounds or the like.

Because of the slow continuous transition in conjunction with an elongated driving and braking phase in which the torque is reduced to zero, assumes negative values, and then makes a continuous transition to the aperiodic position adjusting phase, not only is the noise generated during film transport minimized but also film-protective operation is ensured because of the continuous acceleration or speed of the film transport sprocket that is adapted to the movement of the film, in which the edges of the holes are not subjected to any significant stress.

Since the actual acceleration phase makes no significant contribution to noise generation during a film transport step, the acceleration forces are increased and hence the acceleration phase is considerably decreased in order to compensate for the longer transition phase from the driving phase to the braking phase and also to position the film precisely in front of the film gate within the period of time available, namely 10 ms.

Since at the beginning of the film transport step, i.e. at the beginning of the steep acceleration rise, the teeth of the film transport sprocket fit tightly against the starting hole edges of the film because of the aperiodic adjusting procedure in the position-adjusting phase of the previous film transport step in which the film is pulled into the final position, despite the strong accelerating forces, no impact against the hole edges takes place. Thus there are no dynamic stresses of higher order in the form of a sudden movement against the edges of the holes, so that film-protective film transport can be ensured over the entire film transport step.

In the braking phase, the teeth of the film transport sprocket that are in engagement with the film holes rest loosely against the edges of the hole edges which are forward in the transport direction and move along with the speed of motion of the film. The transport pattern is adjusted during the braking phase so that in view of the frictional conditions in the film channel, the teeth of the film transport sprocket are always in the film hole edges with play but without striking the edges of the film holes.

At the end of the braking phase, even in the case where the teeth of the film transport sprocket are in the film hole edges with play, a gentle rise in torque causes the teeth which are in engagement with the holes to abut the edges of the perforation hole edges which are forward in the transportation direction, creating a gentle transition to the aperiodic position adjusting phase for final positioning of the frame.

In the position-adjusting phase, the teeth of the film transport sprocket are against the perforation hole edges that are forward in the direction of motion, since, in view of the frictional conditions in the film channel, they pull the film continuously into the end position. The transport pattern setting ensures that the film does not run ahead of the movement of the film transport sprocket but is pulled by the film transport sprocket into the correct final position.

To optimize regulation of the film transport steps, especially to create specific conditions at the end of the transport phase and at the beginning of the position adjusting phase, an adaptive regulation is also performed in which the deviation of the torque from the regulated value at the end of the transport phase is determined and the regulator, at the beginning of the next film transport step, receives a torque set value which is dimensioned to achieve a reduction of the deviation from the regulation. Hence, a likewise gentle transition is ensured from the braking phase to the position adjusting phase.

The invention will now be described in greater detail with reference to the embodiments shown in the drawing.

Figure 1:
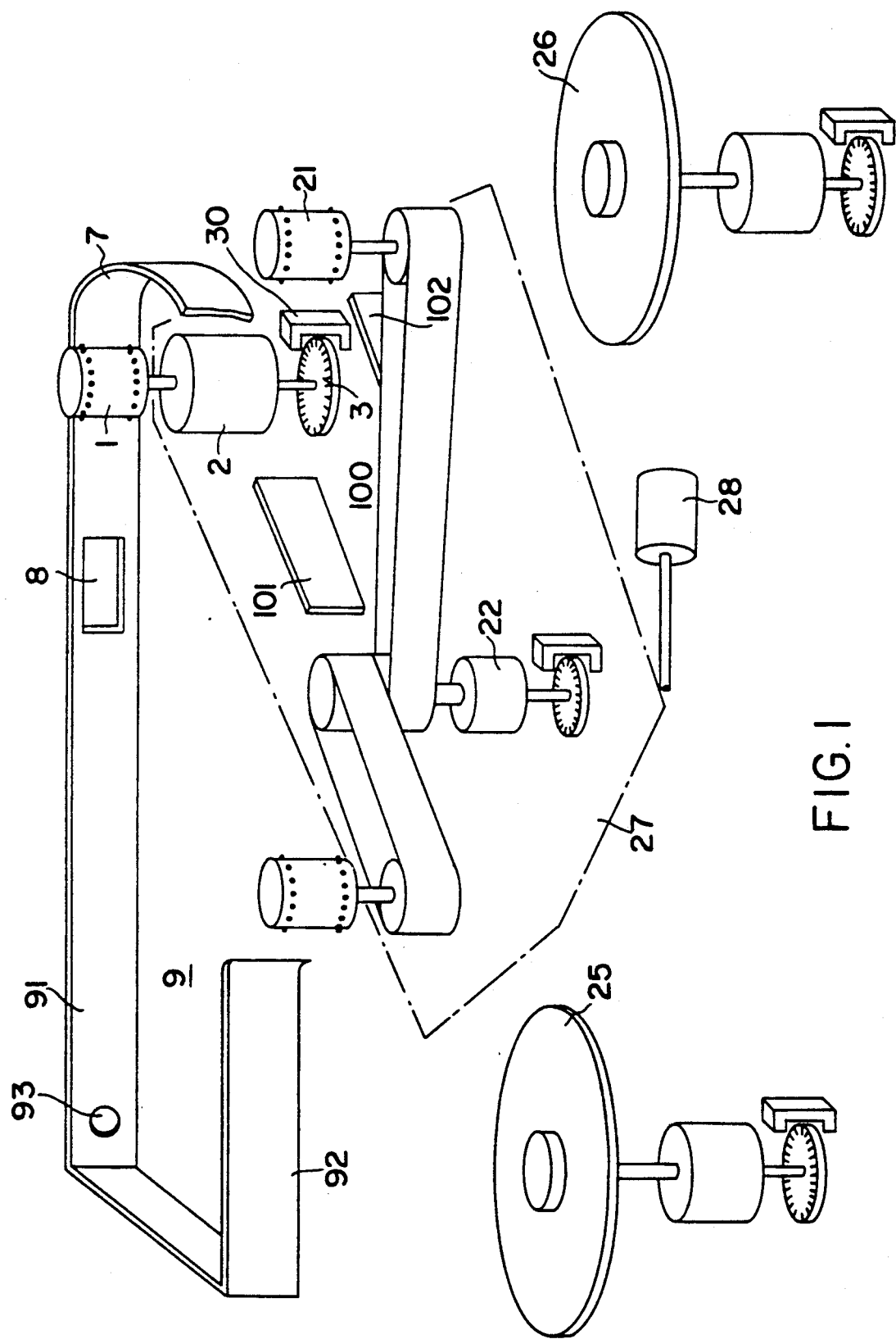
FIG. 1 is a schematic perspective view of the film transport device of a film projector.

The schematic perspective view of the film transport device of a film projector shown in FIG. 1 shows a film transport device with a film sprocket 1, a drive motor 2, and an angle indicator disk 3, supply and takeup devices 20, 21, driven by a common drive device 22, winding devices 25, 26 supporting the film reels, and, in a simplified schematic perspective view, film loop channels 9 and 100 provided on either side of film gate 8 to take up the film loops.

Drive motor 2, composed of a high-dynamic DC servomotor, transmits its rotary motion through direct-driven film transport sprocket 1 to the film. Drive motor 2 is permanently connected by a shaft with angle indicator disk 3, so that the exact position of drive motor 2 can be determined and conducted by means of an optoelectronic position scanner 30.

Film loop channels 9, 100 serve to take up the film loops formed on either side of film gate 8, with a loop-measuring device 93 being provided in film loop channel 9 located to the left of film gate 8. Film-loop measuring device 11 can consist of a reflected-light cabinet or a light-emitting diode combined with a phototransistor opposite.

Film loop channel 9 is formed by two film loop channel walls 91, 92, with one film loop channel wall 91 containing film gate 8 and formed as a film wedge 7 in the vicinity of film transport sprocket 1, said wedge deflecting the film around the film transport sprocket.

An adjusting carriage 27 mounted on suitable guides is driven by an adjusting motor 28 and carries the imaging optics, the film transport device including a film stage with film pressure plate, supply and takeup devices 20, 21, a pivot wedge, and drive device 22.

Figure 2:
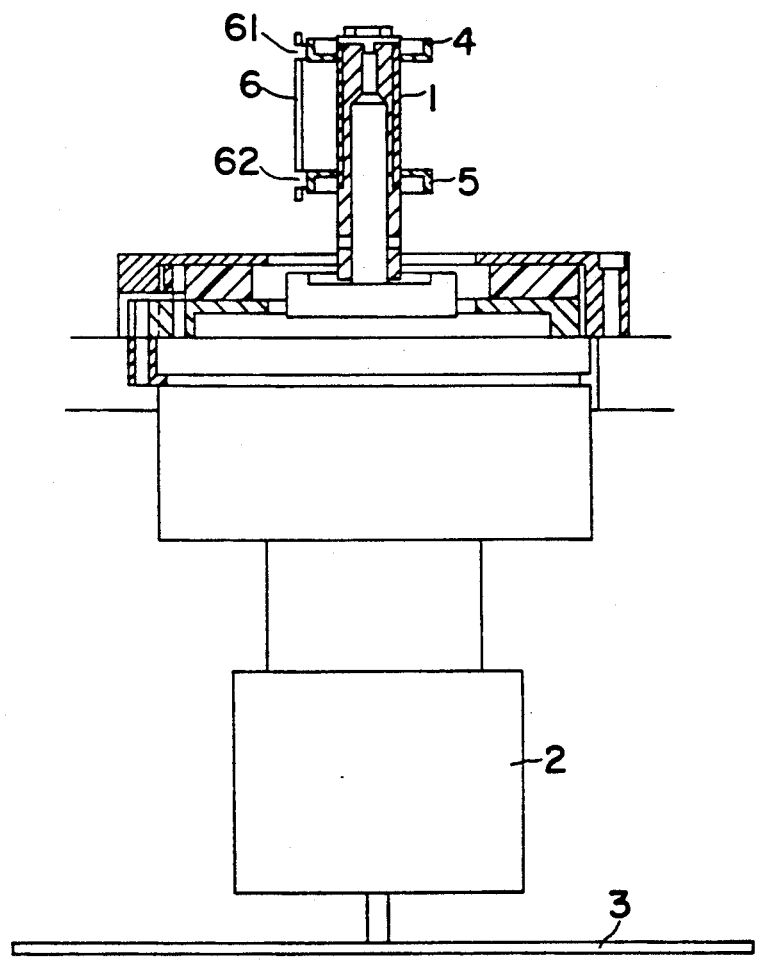
FIG. 2 is a cross section through a film transport device with a film transport sprocket.

The cross section shown in FIG. 2 through a film transport device shows a film transport sprocket with two rows of teeth 4, 5, said sprocket being permanently attached to the shaft of a drive motor 2, on whose shaft an angle indicator disk 3 for exact positioning of drive motor 2 is also mounted. The upper and lower rows of teeth 4 and 5 of film transport sprocket 1 engage matching rows of holes 61, 62 in a film 6, with the engagement being caused by a guide not shown in greater detail in the form of a film wedge or the like.

The engagement of the teeth of film transport sprocket 1 in the film holes takes place over a circumferential area of the film transport sprocket that depends on the film path, so that several teeth of each tooth circle 4, 5 of film transport sprocket 1 simultaneously engage matching holes in the film perforations. Usually four to five teeth of film transport sprocket 1 simultaneously engage the film holes.

In addition, the teeth of film transport sprocket 1 engage the film holes while maintaining a certain amount of play, i.e. the thickness of the teeth of film transport sprocket 1 is less than the width of the holes. In this manner, the teeth of film transport sprocket 1 are prevented from abutting the sides of the holes on both sides, which because of the film tension, would lead to damage to the film holes and to an increased noise level.

However, this play between the teeth of film transport sprocket 1 and the film holes, while maintaining a preset film tension, results in inexact positioning of the individual frames in front of film gate 8, so that the advantage of exact positioning with the aid of an angle indicator system for drive motor 2 is cancelled out by this inaccurate guidance of film 6.

Figure 3:
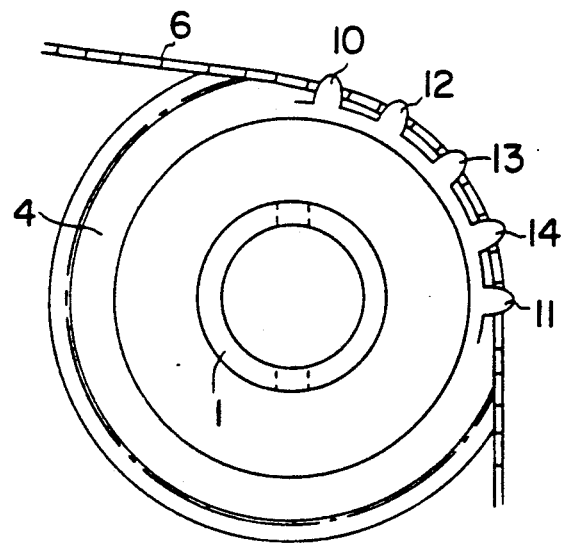
FIG. 3 is a top view of a row of teeth of a film transport sprocket engaging a film perforation.

In order to transfer the exact positioning of the film which is created by using a drive motor for the film transport sprocket with an angle indicator system, to the positioning of the film in front of the film gate, the movement of film 6 before the projection of a frame is adjusted so that the leading edge of at least one tooth 10 to 14 on film transport sprocket 1, which is leading in the direction of rotation of film transport sprocket 1, according to FIG. 3 abuts the leading edge of at least one hole in the perforations at the moment a frame is projected.

FIG. 3 is an illustration of a tooth 11 at the limit of engagement, said tooth abutting the leading edge of a matching hole in the perforations in film 6.

Figure 4:
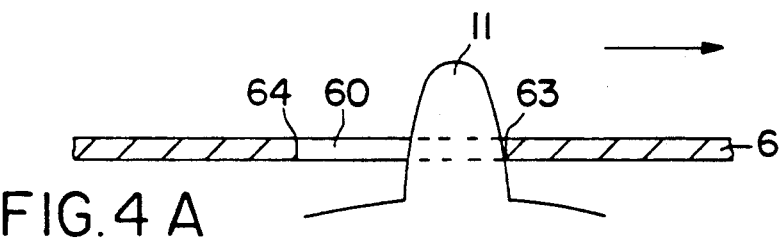
FIG. 4A-4C are schematic diagrams of a tooth of a film transport sprocket in the transport and position-adjusting phase.
Figure 4:
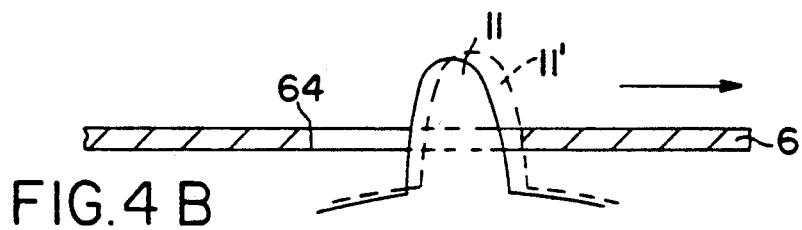
Figure 4:
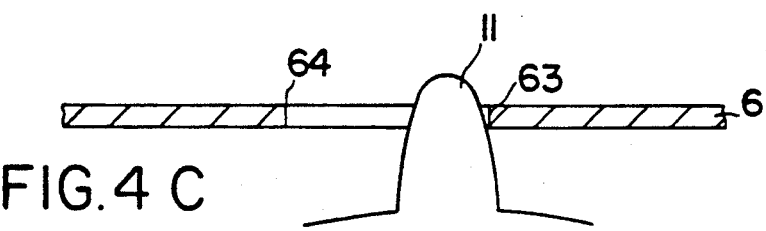

To clarify the pattern of motion of the film transport sprocket and the film during a film step, FIG. 4 is a schematic representation of the position of a tooth 11 of film transport sprocket 1 relative to a hole 60 in film 6 to be transported.

In the acceleration and drive phase (FIG. 4A) at least one tooth 11 of teeth 10 to 14 of the film transport sprocket which are in engagement with film holes 61, 62 as shown in FIG. 3 abuts the leading edge 63 of a perforation hole 60 which is forward in the direction of transport and accelerates film 6 until it reaches its maximum speed, with the film transport direction being indicated schematically by an arrow.

In the braking phase, tooth 11 loosely abuts leading edge 63 of hole 60, or tooth 11' is located within hole 60 (FIG. 4B) with play. Film transport sprocket 1 is then moved so that it follows the movement of film 6 after it is accelerated without conferring additional acceleration on film 6 or striking the trailing edge 64 of hole 60 and braking it.

Finally, in the position-adjusting phase shown in FIG. 4C, tooth 11 of film transport sprocket 1 abuts the leading edge 63 of hole 60, even when it has been moved previously in the braking phase with play 11' within hole 60. In the position-adjusting phase, the film is drawn aperiodically into the final position, in which it is flush with the film gate in the film channel and always assumes exactly the same position to avoid vertical framing errors.

Figure 5:
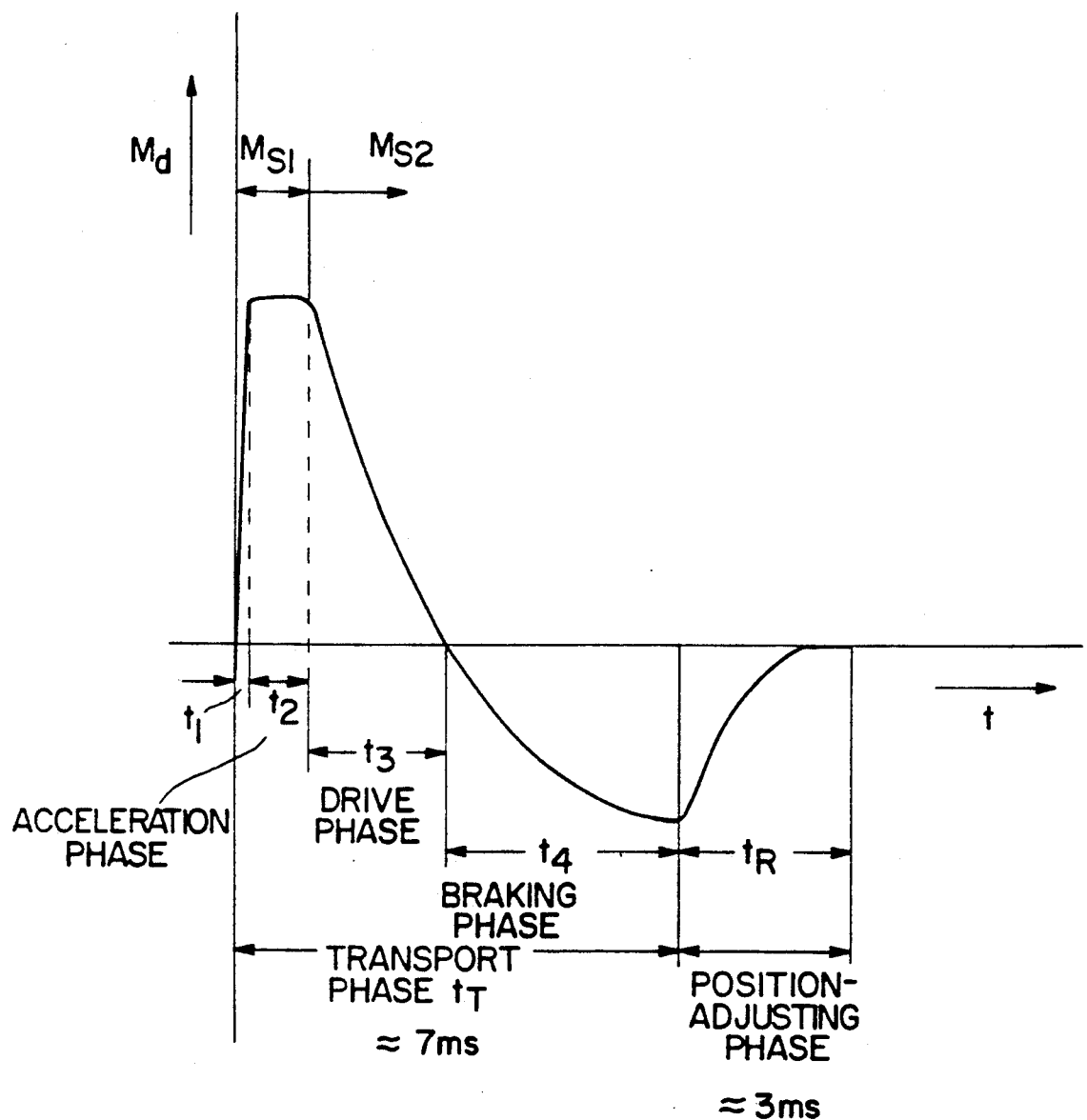
FIG. 5 shows the pattern of the torque settings for driving the film transport sprocket over time.

FIG. 5 shows a graph of the torque setting as a function of time for the drive motor regulator to explain the relationships within a film transport step. The torque plotted on the ordinate may be replaced by the current pattern supplied to the drive motor.

As the diagram in FIG. 5 shows, a film transport step consists of a transport phase $t_T$ and a position-adjusting phase $t_R$. Transport phase $t_T$ is composed of an acceleration rise phase $t_1$ and a phase of approximately constant acceleration $t_2$ as well as a drive phase $t_3$ and a braking phase $t_4$.

During acceleration phase $t_1$, $t_2$ a first torque set value $M_{S1}$ is set which is considerably above the torque setting of conventional transport patterns.

During drive and braking phases $t_3$, $t_4$ at least one second torque set value $M_{S2}$ is set. However, preferably the entire transport pattern is stored pointwise in a memory and called up for each film transport step.

To position a frame in front of the gate in a projector, a period of time of 10 ms is available in order to ensure a sufficient exposure time for each frame at a film speed of 24 frames per second. Of this period of time for a film transport step, approximately 7 ms are available for transport phase $t_T$ and the remaining 3 ms for aperiodic regulation during position adjusting phase $t_R$.

The set value setting during acceleration phase $t_1$, $t_2$ and/or the pointwise set value setting in drive and braking phases $t_3$, $t_4$ occurs as shown in FIG. 5 as follows: a short steep acceleration rise takes place during phase $t_1$ which is followed by a relatively short phase of constant acceleration $t_2$. This is followed by a gentle transition from drive phase $t_1$, $t_2$ to braking phase $t_3$, $t_4$, with the drop in the acceleration setting being slight and continuous.

After point in time $t_3$ the acceleration set value setting changes sign and initiates braking phase $t_4$. At the end of braking phase $t_4$, aperiodic regulation of position-adjusting phase $t_R$ begins, continuing until the frame reaches the exact set position.

As the diagram in FIG. 5 clearly indicates, the durations $t_3$, $t_4$ of the drive and braking phases are multiples of the durations $t_1$, $t_2$ of the acceleration phase so that a high, steep acceleration is achieved to shorten the acceleration phase in order to gain sufficient time for a gentle transition from the drive phase to the braking phase as well as gentle braking of the film before initiation of the aperiodic regulation of the position-adjusting phase.

At the end of braking phase $t_4$, before initiation of position-adjusting phase $t_R$, the degree of regulation is determined and its deviation from a preset set value is used as a precondition for the subsequent film transport step or a series of successive film transport steps. This adaptive regulation improves the pattern of motion of the film during a plurality of film transport steps so that at the end of braking phase $t_3$, specific conditions exist which permit an aperiodic movement of the film during the position adjusting phase. This is intended to prevent over-oscillation in the position-adjusting phase and to ensure a gentle continuous pattern of motion during the position-adjusting phase.

The detection of the adjusting parameter at the end of braking phase $t_4$ and its comparison with a preset set value results in displacement of the entire torque curve in the manner of an offset, so that for example with insufficient acceleration during the acceleration phase followed by the resultant strong deviation in adjustment at the end of the braking phase in the next film transport step, a larger set value for the torque is given in the acceleration phase and at the end of braking phase $t_4$ a adjusting parameter is present which lies in a desirable tolerance range. Then the final positioning of the frame takes place by presetting the voltage during the position adjusting phase.

Adaptive regulation of torque ensures that during a transition from the braking phase to the position adjusting phase there is no abrupt acceleration of the film and hence a gentle transition even in these two phases. In this way the film-protective and highly noise-reducing effect of the solution according to the invention is reinforced.

The invention is not limited in its embodiments to the preferred embodiment described above. Rather, a number of variations are possible, which make use of the solution shown even in fundamentally differently forms. In particular, the embodiment is not limited to the implementation with discrete logic modules but can advantageously be accomplished also with programmed logic, preferably using a microprocessor.

I claim:

1. Film transport device comprising film gate structure, a toothed film transport sprocket, a drive motor for driving said sprocket, the teeth of said sprocket engaging the holes in a motion picture film with play for transporting said film stepwise one frame at a time and final-positioning it at a film gate, with each film step being divided into a transport phase and a position adjusted phase acting on the film, and a drive motor regulator coupled to said drive motor for controlling said drive motor such that each film step of said sprocket as driven by said drive motor is divided into a transport phase and a position adjusted phase acting on the film, said transport phase ($t_T$) being composed of a short acceleration phase ($t_1$, $t_2$) with a steep acceleration slope ($t_1$) and large torque set value ($M_{S1}$) and a long continuous drive phase ($t_3$) and braking phase ($t_4$), whose time duration is a multiple of the acceleration phase ($t_1$, $t_2$), said drive motor regulator being subjected to torque set values ($M_{S1}$, $M_{S2}$) over the entire duration of said transport phase ($t_T$), said higher torque set value ($M_{S1}$) in said acceleration phase ($t_1$, $t_2$), being kept essentially constant over a short time interval ($t_2$), said second torque set value ($M_{S2}$) in the drive and braking phases ($t_3$, $T_4$) being reduced approximately linearly, without said set value ($M_{S2}$) jumping to a negative torque set value (delay torque) and making a continuous transition to a position adjusted phase ($t_R$), said torque values ($M_{S1}$, $M_{S2}$) being stored pointwise in said acceleration phase ($t_1$, $t_2$), said drive phase ($t_3$), and said braking phase ($t_4$), the teeth (10 to 14) of said film transport sprocket (1), which engage film holes (60), abutting the edges of perforation holes (63) which are forward in the direction of motion, during said acceleration phase ($t_1$, $t_2$), said sprocket teeth which engage said film holes (60) being either carried along with play in holes (60) or having their leading edges in the direction of motion abutting the leading edges (63) of holes in the direction of motion in said driving and braking phases ($t_3$, $t_4$), and said sprocket teeth having their forward edges in the direction of movement abutting the forward edges (63) of holes during said position-regulating phase ($t_R$), so that film (6) is pulled aperiodically into the exact final position.

2. Film transport device according to claim 1 and further including means for adjusting said torque setting so that in said driving and braking phases ($t_3$, $t_4$), said sprocket teeth which engage film holes (60), in view of the frictional conditions in the film channel, abut the forward edges (63) of said holes in said film.

3. Film transport device according to claim 2 and further including means for detecting the deviation of the torque regulated value from a preset value at the end of said transport phase ($t_T$) and means for presetting a torque set value ($M_{S1}$, $M_{S2}$) at the beginning of the following film transport step or the following film transport steps whose value is so dimensioned that it constitutes a reduction of the deviation of the regulated torque value from the preset value.

4. Film transport device according to claim 1 and further including means for regulating deviation at the end of the following film transport step or the following film transport steps to a value of zero.

5. Film transport device according to claim 4 and further including means for detecting the deviation of the torque regulated value from a preset value at the end of said transport phase ($t_T$) and means for presetting a torque set value ($M_{S1}$, $M_{S2}$) at the beginning of the following film transport step or the following film transport steps whose value is so dimensioned that it constitutes a reduction of the deviation of the regulated torque value from the preset value.

6. Film transport device comprising film gate structure, a toothed film transport sprocket adjacent said film gate structure, said sprocket teeth engaging the holes in a motion picture film with play, a drive motor for driving said sprocket to transport said film stepwise one frame at a time and final-positioning at said film gate structure, and a regulator coupled to said drive motor for controlling said drive motor such that each film step of said sprocket as driven by said drive motor is divided into a transport phase and a position adjusting phase acting on the film, said transport phase ($t_T$) being composed of a relatively short acceleration phase ($t_1$, $t_2$) with a steep acceleration slope ($t_1$) and large torque set value ($M_{S1}$) and a long continuous drive phase ($t_3$) and braking phase ($t_4$), the time duration of said drive and braking phase ($t_3$, $t_4$) being a multiple of said acceleration phase ($t_1$, $t_2$).

7. Film transport device according to claim 6 wherein said regulator causes said drive motor to produce a torque set value ($M_{S1}$, $M_{S2}$) over the entire duration of said transport phase ($t_T$), a higher torque set value ($M_{S1}$) being supplied by said drive motor in said acceleration phase ($t_1$, $t_2$) and said set value being kept essentially constant over a short time interval ($t_2$), and said torque set value ($M_{S2}$) in said drive and braking phases ($t_3$, $t_4$) being reduced approximately linearly, without said torque value jumping to a negative torque value (delay torque) and making a continuous transition to a position adjusting phase ($t_R$).

8. Film transport device according to claim 7 wherein said regulator generates a minor time change in the torque ($M_d$) at the transition from said acceleration phase ($t_1$, $t_2$) to said drive phase ($t_3$).

9. Film transport device according to claim 7 or 8 and further including a memory, and wherein said torque set value ($M_{S1}$, $M_{S2}$) of said acceleration phase ($t_1$, $t_2$), said drive phase ($t_3$), and said braking phase ($t_4$) are stored pointwise in said memory.

10. Film transport device according to claim 6 wherein said teeth of said film transport sprocket which engage said film holes (60), abut edges (63) of said holes which are forward in the direction of motion during said acceleration phase ($t_1$, $t_2$), said teeth of said film transport sprocket which engage film holes being either carried along with play in said holes or having their leading edges in the direction of motion abutting the leading edges of said holes in the direction of motion in said driving and braking phases ($t_3$, $t_4$), and said teeth of said film transport sprocket having their forward edges in the direction of movement abutting the forward edges of said holes which are forward in the direction of motion during said position-regulating phase ($t_R$), so that said film is pulled aperiodically into the exact final position.

11. Film transport device according to claim 6 wherein said regulator is adapted to adjust the torque setting so that in said driving and braking phases ($t_3$, $t_4$), and said teeth of said film transport sprocket in view of frictional conditions in the film channel, abut forward edges of said film perforations.

12. Film transport device according to claim 6 and further including means for detecting the deviation of the torque regulated value from a preset value at the end of said transport phase ($t_T$) and for presetting a torque set value ($M_{S1}$, $M_{S2}$) at the beginning of the following film transport step or the following film transport steps whose value is so dimensioned that it constitutes a reduction of the deviation of the regulated torque value from the preset value.

13. Film transport device according to claim 12 wherein the deviation at the end of the following film transport step or the following film transport steps is regulated to a value of zero.

* * * * *